May 14, 1940.   A. R. FISHER   2,200,331
APPARATUS FOR FREEZING BERRIES
Filed Dec. 13, 1938

ALAN R. FISHER
INVENTOR.

BY

ATTORNEY.

Patented May 14, 1940

2,200,331

UNITED STATES PATENT OFFICE 2,200,331

APPARATUS FOR FREEZING BERRIES

Alan R. Fisher, New York, N. Y.

Application December 13, 1938, Serial No. 245,361

16 Claims. (Cl. 62—104)

My invention relates to the apparatus for freezing berries and has particular reference to apparatus for quick freezing of berries and similar vegetable products such as peas, beans, etc.

In freezing berries and similar vegetable products for their preservation and transportation, it is important that the berries be brought to the freezing temperature in the shortest possible time in order to conserve their taste and flavor. Ordinary methods of freezing berries in bulk are not very satisfactory, being too slow, having also a disadvantage in that the berries are more or less compressed, largely deformed, lose some of their juice, retain a relatively large amount of the sweet brine used for their preservation, and are usually frozen together in bunches or lumps.

In order to overcome these disadvantages, I have provided a machine in which berries are quickly frozen by being moved in contact with a sugar solution cooled to a low temperature such as 0° or slightly higher. The quickly frozen berries are moved successively over a number of deflecting or spreading plates some of which are perforated for extracting the excess refrigerating liquid. The latter is collected separately and removed from the machine, while the frozen berries are also removed, being separated and polished by their movement over the plates. In one embodiment of my invention I employ a rotatable vertical shaft with spreading disc-shaped plates, supported in a casing with deflecting baffles between the rotatable plates, the berries being moved over the plates by the rotation of the shaft. I also provide means to remove the excess liquid from the berries by passing it through perforated plates and separately collecting.

The berries, when removed from my machine, are fully frozen and have a smooth, polished surface, with a thin coating of sugar, all the berries being separated from each other.

My invention is more fully described in the accompanying specification and drawing in which—

Figure 1:
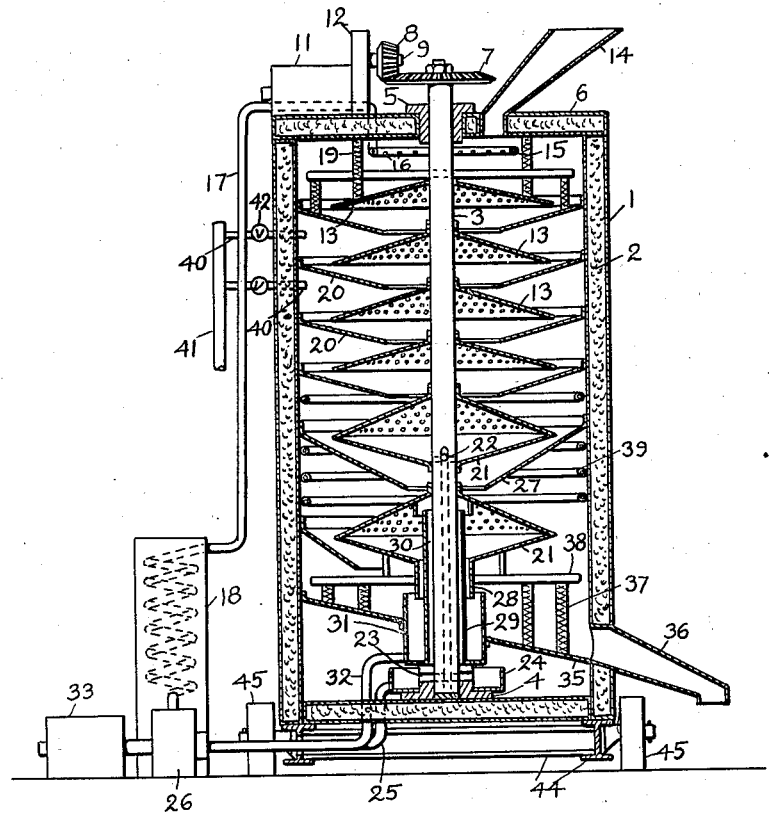
Fig. 1 is a sectional elevation of my machine.
Figure 2:
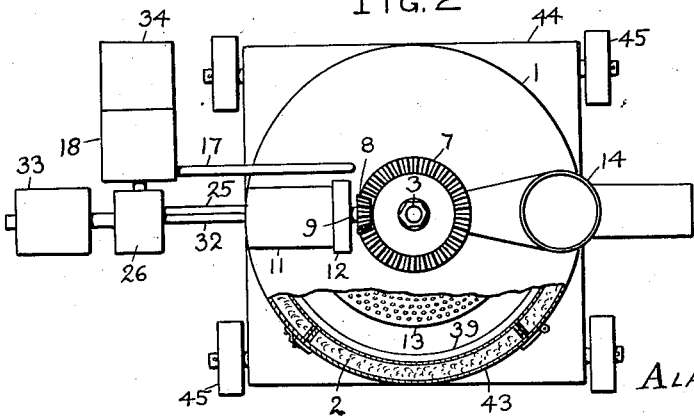
Fig. 2 is a top plan view partly in section.

My machine consists of a vertical cylindrical casing 1 having double walls with a heat insulating material 2 inside such as rock wool, asbestos, etc. A shaft 3 is mounted in the casing, the axis of the shaft being concentric with the axis of the casing. The lower end of the shaft is supported in a footstep or thrust bearing 4, the upper end being journaled in a bearing 5 in the cover 6 of the casing. A bevel gear 7 is mounted on the end of the shaft in mesh with a similar gear 8 on the end of a drive shaft 9, transmitting rotation to the vertical shaft 3 from a motor 11 through a reduction gear box 12.

The shaft 3 mounts a plurality of disc-shaped deflecting or spreading plates 13 in the form of flat cones made of perforated sheet metal or wire mesh. A hopper 14 is mounted on the cover 6 for delivering berries onto the upper deflecting plate 13. The berries are moved over the plate 13 by wipers 10 mounted on an arm 14' attached to the shaft 3. A ring-shaped pipe 15 is mounted under the cover and is provided with small holes 16 for pouring a special refrigerating solution on the berries deposited on the upper plate 13, the solution being fed through a pipe 17 from a heat exchanger 18. The liquid is delivered to the berries at a low temperature, preferably 0° F. and not more than 5 or 10° F., so that the berries become frozen almost instantly. They are scraped off the top plate 13 by flexible scrapers or wipers 19 preferably made of rubber, attached to the cover 6. The excess refrigerating liquid passes through the holes in the plate 13 and fall on the lower plates, coming again in contact with the berries. The latter are thrown off the plates 13 by the rotation of the shaft but are turned back to the next plates 13 below by stationary baffle plates 20 placed between the rotary plates 13.

The stationary baffles are in the shape of inverted cones open at the bottom, the openings being sufficiently large for the berries to pass onto the lower deflecting plates 13. The lower plates 13 are connected with collecting plates 21 in the form of inverted cones mounted on the shaft 3. The shaft is hollow inside and has communicating apertures 22 at the bottom of the collecting plate 21 so that the liquid collected in the plates 20 is drained away through the hollow shaft 3. The latter has holes 23 at the bottom for the liquid to escape into a bottom container 24 connected with a drain pipe 25. The lower collecting plate 27 has a tubular extension 28 at the bottom passing with a clearance over a tube 29 concentric with the shaft 3 and spaced with a small clearance 30. The tube 29 represents an inner wall of an annular receptacle or vessel 31 for the liquid escaping from the plate 27 through the bottom extension 28. A drain pipe 32 is connected with the bottom of the vessel 31. Both drain pipes, 25 and 32, are connected to the intake of a pump 26 operated by a motor 33. The pump delivers the liquid to the heat exchanger 18 connected with a refrigerating mechanism 34 of an ordinary construction. The refrigerating liquid therefore continuously circulates through the machine, freezing the berries, while the latter are rolled over the perforated plates, being thereby separated from each other and polished or smoothed on the outside. They finally fall on an inclined bottom plate 35 from which they roll into a duct 36 to be gathered into suitable containers for storage or shipment. Flexible scrapers or wipers 37 are mounted on arms 38 fitted on the shaft 3 and serve to remove the berries from the plate 35. Additional refrigeration is provided in the casing by the pipes 39 through which circulates a suitable refrigerant. Water pipes 40 extend into the casing from a water header 41 with valves 42 and are used for washing the casing inside. A door 43 is provided at the front for inspecting and cleaning the machine inside. The casing is mounted on a frame 44 with wheels 45 so that it can be moved from one place to another. The pipes may be, of course, disconnected for moving the casing.

Important advantages of my machine and method of freezing berries are that the berries are obtained in a quickly frozen condition, largely retaining their natural taste and flavor, with the minimum of the sugar solution retained on their surface, the shape of the berries being preserved intact.

It is understood that my machine can be modified without departing from the spirit of my invention as set forth in the appended claims.

I claim as my invention:

1. A method of quick-freezing berries consisting in subjecting berries to the direct action of a sugar-containing refrigerating fluid, and successively moving the berries with the fluid over a plurality of alternately positioned and vertically spaced rotary and stationary surfaces thereby separating the frozen berries from each other.

2. A method of quick-freezing berries consisting in subjecting berries to the direct action of a sugar-containing refrigerating fluid, and successively moving the berries with the fluid over a plurality of differently inclined alternately positioned movable and stationary surfaces thereby separating the frozen berries, and removing the excess of the refrigerating fluid from the berries.

3. A quick freezing apparatus for berries comprising a casing, a plurality of deflecting plates in the casing, means to deliver berries to the plates, means to apply a refrigerating sugar solution to the berries thereby freezing them, and means to progressively move the frozen berries over the plates for their separation.

4. A quick freezing apparatus for berries comprising a casing, a plurality of deflecting plates in the casing, means to deliver berries to the plates, means to apply a refrigerating sugar solution to the berries thereby freezing them, and means to progressively move the berries over the plates for separating the berries, the plates having perforations for removing the excess of the refrigerating solution from the berries.

5. A quick freezing apparatus for berries comprising a casing, a plurality of deflecting plates rotatively supported in the casing, means to deliver berries to the plates, means to apply a refrigerating sugar solution to the berries thereby freezing them, and means to rotate the plates thereby causing the berries to progressively move over the plates, the plates having perforations for removing the excess of the refrigerating solution from the berries.

6. A quick freezing apparatus for berries comprising a casing, a plurality of deflecting plates movably supported in the casing, one above the other stationary baffle plates between the movable plates, means to deliver berries to the upper deflecting plates, means to apply a refrigerating sugar solution to the berries, and means to move the movable plates for loosening the berries from the plates thereby causing the frozen berries to move progressively from the movable to the stationary plates.

7. A quick freezing apparatus for berries comprising a casing, a plurality of deflecting plates rotatively supported in the casing, stationary baffle plates between the rotary plates, means to deliver berries to the rotary plates, means to apply a liquid refrigerant to the berries thereby freezing them, and means to rotate the rotary plates thereby causing the berries to progressively move by centrifugal force over the rotary and stationary plates for separating the frozen berries, the plates having perforations for removing the excess of the refrigerating solution from the berries.

8. A quick freezing apparatus comprising a casing, a substantially vertical shaft rotatively supported in the casing, deflecting plates on the shaft stationary guiding plates between the shaft plates, means to deliver berries to the plates at one end of the shaft, means to freeze the berries on the plates, means to rotate the shaft with the plates, and means to progressively move the berries from one deflecting plate to another for separating the frozen berries.

9. A quick freezing apparatus comprising a casing, a vertical shaft rotatively supported in the casing, deflecting plates mounted on the shaft, stationary baffle plates extending from the casing between the shaft plates, means to deliver berries to the upper deflecting plates, means to apply a refrigerating liquid to the berries thereby freezing them, and means to rotate the shaft thereby causing the berries to progressively move by the centrifugal force and by gravity over the rotary and stationary blades to the lower end of the casing, thereby separating the frozen berries from each other, the plates having perforations for removing the excess of the refrigerating liquid from the berries.

10. A quick freezing apparatus comprising a casing, a vertical shaft rotatively supported in the casing, a plurality of disc-shaped deflecting plates on the shaft, stationary downward-inclined baffle plates extending from the walls of the casing between the deflecting plates, means to deliver berries to the upper deflecting plate, means to freeze the berries on the plates, and means to rotate the shaft thereby causing the berries to progressively move downward over the plates and to be separated from each other.

11. A quick freezing apparatus comprising a casing, a vertical shaft rotatively supported in the casing, a plurality of disc-shaped deflecting plates on the shaft, stationary downward-inclined baffle plates extending from the walls of the casing between the disc-shaped plates, means to deliver berries to the upper rotary plate, means to freeze the berries, means to rotate the shaft thereby causing the berries to progressively move downward over the plates and to be separated from each other, and means to scrape the frozen berries off the movable plates.

12. A quick freezing apparatus comprising a casing, a vertical shaft rotatively supported in the casing, a plurality of disc-shaped deflecting plates on the shaft, stationary downward-inclined baffle plates extending from the walls of the casing between the deflecting plates, means to deliver berries to the upper rotary plate, means to freeze the berries, means to rotate the shaft thereby causing the berries to progressively move downward over the plates and to be separated from each other, and yieldable scrapers in contact with the shaft plates adapted to scrape the berries off the plates.

13. A quick freezing apparatus comprising a casing, a vertical shaft rotatively supported in the casing, a plurality of disc-shaped deflecting plates on the shaft, stationary downward-inclined baffle plates extending from the walls of the casing between the deflecting plates, means to deliver berries to the upper deflecting plates, means to freeze the berries, means to rotate the shaft thereby causing the berries to progressively move downward over the plates and to be separated from each other, stationary scrapers in contact with the deflecting plates, and movable scrapers in contact with the stationary plates for moving the berries over the plates.

14. A quick freezing apparatus for berries comprising a casing, a plurality of deflecting plates movably supported in the casing, means to deliver berries to the plates, means to apply a refrigerating sugar solution to the berries, means to move the deflecting plates thereby causing the berries to be progressively moved over the plates for their separation, the deflecting plates having a plurality of perforations for removing the excess liquid from the berries, and means to collect the excess liquid separately from the berries.

15. A quick freezing apparatus comprising a casing, a vertical shaft rotatively supported in the casing, deflecting plates mounted on the shaft, stationary baffle plates extending from the casing between the deflecting plates, means to deliver berries to the upper deflecting plates, means to apply a refrigerating liquid to the berries thereby freezing them, means to rotate the shaft thereby causing the berries to progressively move by the centrifugal force and by gravity over the deflecting and stationary baffle plates to the lower end of the casing, thereby separating the frozen berries from each other, the deflecting plates having perforations for removing the excess liquid from the berries, and a cup-shaped plate on the lower portion of the shaft for collecting the excess liquid, the shaft being perforated for removing the liquid from the collecting cup-shaped plate.

16. A quick freezing apparatus comprising a casing, a vertical shaft rotatively supported in the casing, deflecting plates mounted on the shaft, stationary baffle plates extending from the casing between the deflecting plates, means to deliver berries to the upper deflecting plates, means to apply a refrigerating liquid to the berries thereby freezing them, means to rotate the shaft thereby causing the berries to progressively move by the centrifugal force and by gravity over the deflecting and stationary baffle plates to the lower end of the casing, thereby separating the frozen berries from each other, the deflecting plates having perforations for removing the excess liquid from the berries, a cup-shaped plate on the lower portion of the shaft for collecting the excess liquid, means to remove the liquid collected in the cup-shaped plate, and means to remove from the casing the separated frozen berries.

ALAN R. FISHER.